United States Patent
Ezaki

(10) Patent No.: US 9,622,099 B2
(45) Date of Patent: Apr. 11, 2017

(54) BASE STATION APPARATUS, WIRELESS COMMUNICATION SYSTEM, WIRELESS COMMUNICATION TERMINAL DEVICE, AND METHOD FOR CONTROLLING WIRELESS COMMUNICATION SYSTEM

(71) Applicant: FUJITSU LIMITED, Kawasaki-shi, Kanagawa (JP)

(72) Inventor: Takato Ezaki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 104 days.

(21) Appl. No.: 14/661,284

(22) Filed: Mar. 18, 2015

(65) Prior Publication Data
US 2015/0282140 A1 Oct. 1, 2015

(30) Foreign Application Priority Data

Mar. 28, 2014 (JP) .................. 2014-070338

(51) Int. Cl.
| | | |
|---|---|---|
| H04W 4/00 | (2009.01) | |
| H04W 24/08 | (2009.01) | |
| H04L 27/26 | (2006.01) | |
| H04B 7/01 | (2006.01) | |
| H04L 25/02 | (2006.01) | |
| H04L 5/00 | (2006.01) | |

(52) U.S. Cl.
CPC ......... *H04W 24/08* (2013.01); *H04L 27/2657* (2013.01); *H04L 27/2675* (2013.01); *H04B 7/01* (2013.01); *H04L 5/001* (2013.01); *H04L 5/0044* (2013.01); *H04L 5/0051* (2013.01); *H04L 5/0075* (2013.01); *H04L 5/0094* (2013.01); *H04L 25/0204* (2013.01); *H04L 25/0228* (2013.01)

(58) Field of Classification Search
None
See application file for complete search history.

(56) References Cited

U.S. PATENT DOCUMENTS

2010/0246528 A1\* 9/2010 Huang .................. H04L 5/0007
370/330
2013/0010881 A1\* 1/2013 Noh .................. H04W 72/0413
375/260

FOREIGN PATENT DOCUMENTS

| JP | 2011-077647 | 4/2011 |
|---|---|---|
| JP | 2011-193124 | 9/2011 |

\* cited by examiner

*Primary Examiner* — Minh-Trang Nguyen
(74) *Attorney, Agent, or Firm* — Fujitsu Patent Center

(57) ABSTRACT

A baseband receiving unit receives a signal transmitted from a wireless communication terminal device and including a plurality of symbols arranged in a time direction. A scheduling unit estimates the frequency offset based on a first signal that is for measuring quality and that is mapped to a first symbol placed at a predetermined position in the transmitted signals received with the baseband receiving unit, and a second signal that is for demodulation and that is mapped to a second symbol placed at a position different from the first symbol in the transmitted signal.

9 Claims, 10 Drawing Sheets

FIG.8

|  |  | CARRIER FREQUENCY | | |
|---|---|---|---|---|
|  |  | 800 MHz | 2 GHz | 2.5 GHz |
| TRAVEL SPEED | 200 km/h | 296 Hz | 741 Hz | 926 Hz |
| | 300 km/h | 444 Hz | 1111 Hz | 1389 Hz |
| | 400 km/h | 593 Hz | 1482 Hz | 1852 Hz |

BASE STATION APPARATUS, WIRELESS COMMUNICATION SYSTEM, WIRELESS COMMUNICATION TERMINAL DEVICE, AND METHOD FOR CONTROLLING WIRELESS COMMUNICATION SYSTEM

CROSS-REFERENCE TO RELATED APPLICATION

This application is based upon and claims the benefit of priority of the prior Japanese Patent Application No. 2014-070338, filed on Mar. 28, 2014, the entire contents of which are incorporated herein by reference.

FIELD

The embodiment discussed herein is directed to a base station apparatus, a wireless communication system, a wireless communication terminal device, and a method for controlling a wireless communication system.

BACKGROUND

A Rician fading environment is a state in which a wireless communication terminal device that moves at a high speed communicates with a base station apparatus on the line of sight without any obstacles therebetween. In such a Rician fading environment, the Doppler effect on the signals received at each device and apparatus affects the communication quality significantly as a frequency offset.

In particular, a wireless communication terminal device determines the carrier frequency of the uplink signals based on the carrier frequency of the downlink signals received from the base station apparatus. When signals are transmitted from the wireless communication terminal device, the signals include the Doppler frequency that has been generated in the downlink and added as a frequency offset to the signals. Furthermore, when the signals transmitted from the wireless communication terminal device are received at the base station apparatus, the signals include the Doppler frequency that has been generated in the uplink and added to the signals. In light of the foregoing, the base station apparatus preferably have an ability to remove a frequency offset of which effect is no less than twice as large as the effect of the Doppler frequency.

Mobile communications have widely been spread in these years. This requires wireless communication systems to maintain the communications without any interruption if the user moves at a speed of 300 km/h or higher, for example, on the Shinkansen bullet train. Additionally, High frequencies equal to or higher than 2 GHz are increasingly used as the frequency bands for the mobile communications because many frequency bands have been already used. This generates a very high Doppler frequency. Consequently, this causes the base station apparatus to remove a frequency offset of which effect is no less than twice as large as the effect of the very high Doppler frequency. This makes it difficult for the base station apparatuses to receive signals.

A method in which the correlation between reference signals received at different times is calculated and then the amount of phase rotation between the received signals is known as a conventional common method for estimating a frequency offset.

For example, a received signal $r_k$ is obtained from the following expression (1) when the signal transmitted at a time k is $s_k$, the distortion caused by a propagation channel is $h_k$, the frequency deviation is $\Delta f$, and the white Gaussian noise is $n_k$.

$$r_k e^{j2\pi \Delta f k} h_k s_k, n_k$$

$$\text{phase rotation } e^{\tau 2\pi \Delta f k} \quad (1)$$

The frequency deviation remains after removal of the carrier wave and thus the phase rotation $e^{\tau 2\pi \Delta f k}$ appears in the expression. In that case, the correlation $z(k, \tau)$ between the signal $r_k$ received at the time k and the signal $r_{k+\tau}$ received at a time k+τ is expressed as the following expression (2).

$$z(k, \tau) = r_{k+\tau} r_k^* \quad (2)$$
$$= e^{j2\pi \Delta f \tau} h_{k+\tau} h_k^* s_{k+\tau} s_k^* + e^{j2\pi \Delta f(k+\tau)} h_{k+\tau} s_{k+\tau} n_k^* +$$
$$n_{k+\tau}(e^{j2\pi \Delta f k} h_k s_k)^* + n_{k+\tau} n_k^*$$

On the assumption that the propagation channel does not vary during a signal interval τ, and the transmitted signals $s_k$ and $s_{k+\tau}$ are the same, the average of the correlations $z(k, \tau)$ is zero in and after the second term due to the characteristic of the white Gaussian noise. The following expression (3) can be obtained from the above.

$$E[z(k,\tau)] = e^{j2\pi \Delta f \tau} \quad (3)$$

The frequency deviation $\Delta f$ can be estimated as the following expression (4) according to the results described above. Note that, if the transmitted signals $s_k$ and $s_{k+\tau}$ are predetermined, the frequency deviation $\Delta f$ can similarly be estimated after a simple deformation of the expression.

$$\Delta f = \frac{\arg(E[z(k, \tau)])}{2\pi \tau} = \frac{1}{2\pi \tau} \tan^{-1}\left[\frac{\text{Im}(E[z(k, \tau)])}{\text{Re}(E[z(k, \tau)])}\right] \quad (4)$$

To prevent any high Doppler frequency from deteriorating the estimation accuracy, a conventional technique that increases the number of reference signals to be added to a Physical Uplink Shared Channel (PUSCH) that is uplink data signals is used when the improvement effect of the increase on the deterioration is confirmed. There is also a conventional technique that creates a reference signal transmission schedule suitable for estimating the highest Doppler frequency.

Patent Document 1: Japanese Laid-open Patent Publication No. 2011-77647
Patent Document 2: Japanese Laid-open Patent Publication No. 2011-193124

However, the range of the inverse tangent function is $-\pi < \tan^{-1} x < \pi$ in the conventional estimating methods, and thus the range in which the frequency deviation $\Delta f$ can be estimated is limited to $-\frac{1}{2\tau} < \Delta f < \frac{1}{2\tau}$ in the conventional estimating methods. The range in which the frequency deviation can be estimated equates with the range in which the frequency offset can be estimated. This means that the range in which the frequency offset can be estimated is determined depending on the signal interval τ. For example, when the signal interval τ is 1 ms, the frequency offset can be estimated in the range in of ±500 Hz.

As indicated in the expression (4), the angle fails to be estimated as a unique angle when the signal rotates one or more revolutions along the circumference. In other words, when the amount of phase rotation between the reference signals received at the signal interval τ is estimated as a value θ, it fails to be determined whether the reference signal has rotated by θ at a low speed during the signal interval τ, or the reference signal has rotated by θ+2π at a higher speed.

For example, a reference signal at intervals of 500 μs is transmitted in the PUSCH in the Long Term Evolution (LTE), and thus the frequency offset can be estimated in the range of ±1000 Hz. The interval between the reference signals is 285.417 μs in the Physical Uplink Control Channel (PUCCH) that is the uplink control signals in the LTE, and thus the frequency offset can be estimated in the range of ±1751 Hz. Consequently, it is difficult to estimate the frequency offset in the range of 2000 Hz and higher in the LTE with PUSCH or PUCCH.

If a frequency offset is estimated in a wide range by combining PUSCH and PUCCH, the combination fails to be used to estimate the frequency offset in a cell to which the PUCCH is not transmitted, for example, in the Secondary Cell (SCell) in the Carrier Aggregation (CA).

SUMMARY

According to an aspect of an embodiment, a base station apparatus includes: a receiving unit that receives a transmitted signal which has been transmitted from a wireless communication terminal device and which includes a plurality of symbols arranged in a time direction; and a frequency offset estimating unit that estimates a frequency offset based on a first signal which is mapped to a first symbol placed at a predetermined position in the transmitted signal received with the receiving unit and which is for measuring quality, and a second signal which is mapped to a second symbol placed at a position different from the first symbol in the transmitted signal and which is for demodulation.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram of the Doppler frequency in signals received at the base station apparatus, determined according to the wireless communication terminal device and the carrier frequency;

DESCRIPTION OF EMBODIMENTS

Preferred embodiments of the present invention will be explained with reference to accompanying drawings. Note that the base station apparatus, wireless communication system, wireless communication terminal device, and method for controlling the wireless communication system disclosed in the present application are not limited to the embodiments described below.

[a] First Embodiment

Figure 1:
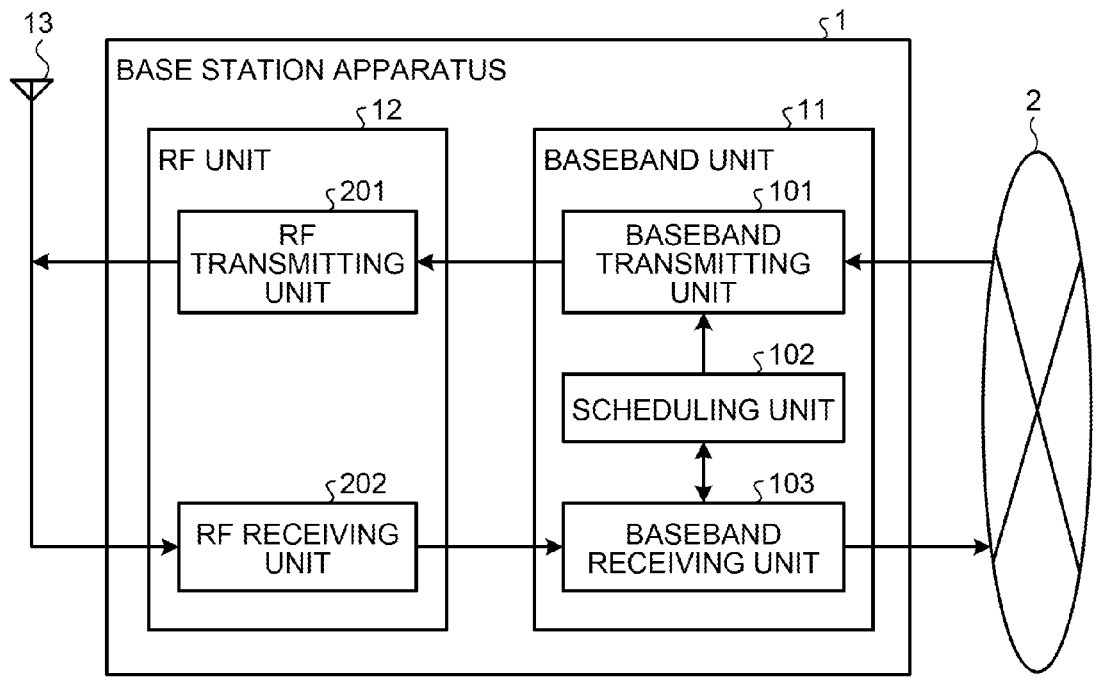
FIG. 1 is a block diagram of a base station apparatus.

FIG. 1 is a block diagram of a base station apparatus. As illustrated in FIG. 1, a base station apparatus 1 includes a baseband unit 11, and a Radio Frequency (RF) unit 12.

The RF unit 12 is connected to an antenna 13. The baseband unit 11 is connected to a line 2.

The RF unit 12 mutually converts a high-frequency band radio signal and a low-frequency baseband signal into each other to process the radio signal. The RF unit 12 includes an RF transmitting unit 201 and an RF receiving unit 202.

The RF transmitting unit 201 processes the signal received from a baseband transmitting unit 101 described below with a predetermined process for transmitting a radio signal. For example, the RF transmitting unit 201 forms a radio signal, for example, by digital-analog conversion, upconversion, and amplification of the signal. Then, the RF transmitting unit 201 transmits the formed radio signal through the antenna 13 to a wireless communication terminal device. The wireless communication terminal apparatus is also referred to as a User Equipment (UE).

The RF receiving unit 202 processes the signal received through the antenna 13 with a predetermined process for receiving a radio signal, for example, downconversion, or analog-digital conversion, and then outputs the signal received and processed with the process for receiving a radio signal to a baseband receiving unit 103 described below.

The baseband unit 11 processes the baseband signal received from the RF unit 12. Specifically, the baseband unit 11 includes the baseband transmitting unit 101, a scheduling unit 102, and the baseband receiving unit 103.

The baseband transmitting unit 101 receives the input of a transmitted signal from the line 2. Additionally, the baseband transmitting unit 101 obtains, from the scheduling unit 102, the result from the allocation of radio resource for each wireless communication terminal device. The allocation includes the allocation of radio resource to PUSCH and the sounding reference signal (Sounding Reference Signal: SRS).

Subsequently, the baseband transmitting unit 101 encodes the transmitted signal received from the line according to the radio scheduling received from the scheduling unit 102. Specifically, the baseband transmitting unit 101 encodes the Physical Downlink Shared Channel (PDSCH) in the whole cell and the Physical Downlink Control Channel (PDCCH) including a control signal in the downlink and a transmission instructing signal in the uplink using the result from the allocation of PUSCH and the like.

Next, the baseband transmitting unit 101 processes the transmitted signals including PDSCH and PDCCH with a process in the data link layer, for example, the header compression, or the division and integration of data according to the radio scheduling received from the scheduling unit 102. Next, the baseband transmitting unit 101 modulates the transmitted signals processed with the process in the data link layer. The baseband transmitting unit 101 further processes the transmitted and modulated signals with an inverse fast Fourier transform process according to the radio scheduling received from the scheduling unit 102. Then, the baseband transmitting unit 101 outputs the signal transmitted and processed with the inverse fast Fourier transform process to the RF transmitting unit 201.

The scheduling unit 102 allocates radio resources for the wireless communication terminal devices communicating with the base station apparatus 1 such that the wireless communication terminal devices transmit and receive data to/from the base station apparatus 1. As the allocation of the radio resources, the scheduling unit 102 allocates the radio resources to the sounding reference signal that is used to measure the quality of the signals in the uplink and PUSCH. The process for allocating the radio resources to the sounding reference signal and PUSCH performed with the scheduling unit 102 according to the present embodiment will be described hereinafter.

Figure 2:
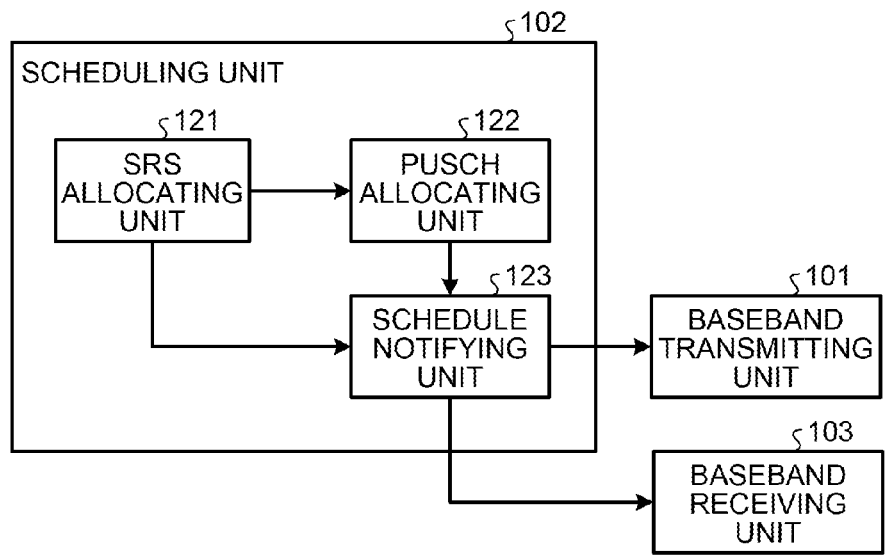
FIG. 2 is a block diagram of each function for allocating SRS and PUSCH in a scheduling unit.

FIG. 2 is a block diagram of each unit for allocating SRS and PUSCH in the scheduling unit. For the sake of description, FIG. 2 illustrates only the units that are used to allocate the sounding reference signal and PUSCH. However, the scheduling unit 102 actually includes, for example, a function unit configured to allocate another radio resource. The scheduling unit 102 includes an SRS allocating unit 121, a PUSCH allocating unit 122, and a schedule notifying unit 123.

The SRS allocating unit 121 stores a fixed period with which a sounding reference signal (SRS) that is a signal used to measure the quality of the signals in the uplink is allocated. The SRS allocating unit 121 determines the radio resource to which the sounding reference signal is allocated with the fixed period. At that time, the SRS allocating unit 121 allocates, to the sounding reference signal, the radio resource in the signals transmitted from each of the wireless communication terminal devices such that the sounding reference signal does not collide with the sounding reference signals of the other wireless communication terminal devices. For example, the SRS allocating unit 121 prevents the sounding reference signals from colliding with each other among the wireless communication terminal devices by transmitting the sounding reference signals at different times or using different frequency bands to transmit the sounding reference signals.

Subsequently, the SRS allocating unit 121 notifies the PUSCH allocating unit 122 and the schedule notifying unit 123 of the result from the allocation of the sounding reference signal to the radio resource for each of the wireless communication terminal devices.

The PUSCH allocating unit 122 obtains the result from the allocation of the sounding reference signal to the radio resource for each of the wireless communication terminal devices from the SRS allocating unit 121. The PUSCH allocating unit 122 allocates, to PUSCH, the radio resource in the sub-frame at the same time and in the same frequency band as the sounding reference signal. For example, the PUSCH allocating unit 122 allocates PUSCH in the following method.

The PUSCH allocating unit 122 calculates a scheduling metric (M) expressed by the following expression (5) for each of the wireless communication terminal devices communicating with the base station apparatus 1. The scheduling metric is similar to the commonly known Proportional Fairness (PF) metric except for S(u, t). The scheduling method is to give a higher priority to allocating PUSCH to a wireless communication terminal device that currently communicates at a high communication rate, and to give a lower priority to allocating PUSCH to a wireless communication terminal device that can transmit a large amount of data on average.

$$M(u) = \frac{S(u, 1)\tau(u)}{R(u)} \quad (5)$$

In the expression, u indicates the numbers sequentially put to the wireless communication terminal devices, and is an index used to identify each of the wireless communication terminal devices. t is a time. In that case, t indicates the index of each sub-frame. Meanwhile, r(u) indicates the average data rate of the wireless communication terminal device of which index is u. Further, S(u, t) is the coefficient used to adjust the allocation in order to facilitate the allocation of PUSCH to the wireless communication terminal device of which index is u at the time at which the wireless communication terminal device of which index is u transmits the sounding reference signal (hereinafter, referred to as an "SRS transmitting timing". S(u, t) is expressed by the following expression (6).

$$S(u, t) = \begin{cases} s\begin{pmatrix} \text{Timing } t \text{ is } SRS \text{ transmitting timing in wireless} \\ \text{communication terminal device of which index is } u \end{pmatrix} \\ 1 (\text{Other than the above}) \end{cases} \quad (6)$$

The value of s in the expression (6) determines the possibility that PUSCH is allocated to the wireless communication terminal device of which index is u at the SRS transmitting timing. For example, s having a larger value facilitates the allocation of the radio resource at the SRS transmitting timing to PUSCH while s having a smaller value makes it difficult to allocate, to PUSCH, the radio resource at the SRS transmitting timing. The PUSCH allocating unit 122 uses a value larger than one as s. The PUSCH allocating unit 122 puts s having a larger value to the wireless communication terminal device to which PUSCH need to be allocated preferentially, for example, a wireless communication terminal device for which the Doppler frequency has not been estimated for a predetermined period of time.

To allocate PUSCH to a radio resource in a sub-frame, the PUSCH allocating unit 122 calculates the scheduling metric (M) expressed by the expression (5) for each of the wireless communication terminal devices. Subsequently, the PUSCH allocating unit 122 selects the wireless communication terminal devices as many as PUSCH can be transmitted in descending order of the value of the scheduling metric (M) as the wireless communication terminal devices that transmit PUSCH in the sub-frame to which PUSCH is to be allocated.

Subsequently, the PUSCH allocating unit 122 allocates the radio resources to PUSCH for the selected wireless communication terminal devices with an allocating process. At that time, among the selected wireless communication terminal devices, the PUSCH allocating unit 122 preferentially allocates, to PUSCH, the radio resource in a sub-frame to which PUSCH is to be allocated for the wireless communication terminal device transmitting the sub-frame to which PUSCH is to be allocated and that is at the SRS transmitting timing. When the wireless communication terminal device transmits the sub-frame to which PUSCH is to be allocated and that is at the SRS transmitting timing, the PUSCH allocating unit 122 allocates the radio resource to PUSCH such that the frequency band for transmitting the sounding reference signal and the frequency band of the radio resource overlap with each other.

As a result, the PUSCH allocating unit 122 can preferentially allocates, to PUSCH, the radio resource in the sub-frame that is at the SRS transmitting timing and in the same frequency band as the SRS for the wireless communication terminal device transmitting the sub-frame to which PUSCH is to be allocated and that is at the SRS transmitting timing.

Subsequently, the PUSCH allocating unit 122 stores the identification information about the wireless communication terminal device for which PUSCH and the sounding reference signal are allocated in the same frequency band in the same sub-frame. For example, the PUSCH allocating unit 122 includes the list of the wireless communication terminal devices communicating with the base station apparatus 1 so as to flag the wireless communication terminal device for which the allocation of the radio resource has been completed with an allocation completion flag.

Subsequently, the PUSCH allocating unit 122 allocates the radio resource to PUSCH for a wireless communication terminal device other than the wireless communication terminal device for which PUSCH and the sounding reference signal are allocated in the same frequency band in the same sub-frame.

Subsequently, the PUSCH allocating unit 122 notifies the schedule notifying unit 123 of the result from the allocation of the radio resource to PUSCH for each of the wireless communication terminal devices.

The schedule notifying unit 123 obtains, from the SRS allocating unit 121, the result from the allocation of the sounding reference signal to the radio resource for each of the wireless communication terminal devices. The schedule notifying unit 123 further obtains, from the PUSCH allocating unit 122, the result from the allocation of the radio resource to PUSCH for each of the wireless communication terminal devices.

Subsequently, the schedule notifying unit 123 outputs the result from the allocation of the radio resource to PUSCH to the baseband transmitting unit 101 and the baseband receiving unit 103.

Figure 3:
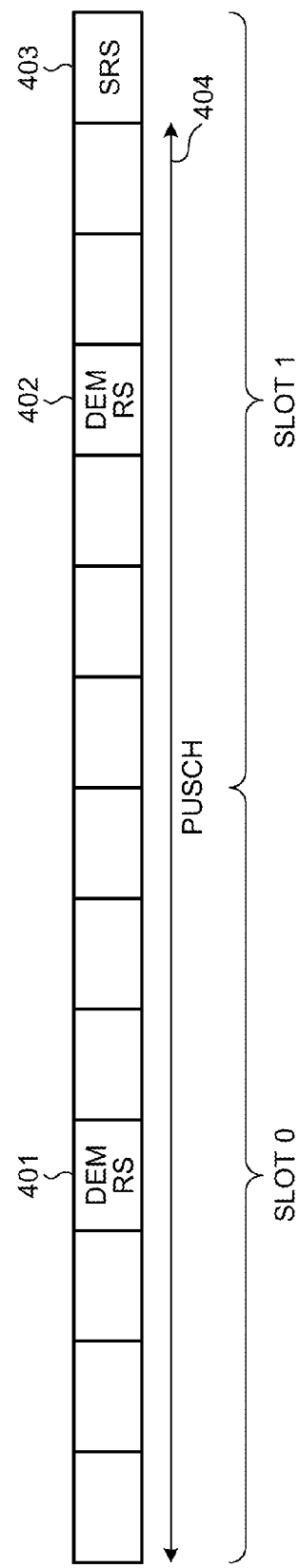
FIG. 3 is a diagram of the time relationship between PUSCH and a sounding reference signal.

For example, the wireless communication terminal device for which the scheduling unit 102 has allocated PUSCH and the sounding reference signal in the same frequency band in the same sub-frame transmits signals as illustrated in FIG. 3. FIG. 3 illustrates that the time elapses toward the right side of the drawing. FIG. 3 is a diagram of the time relationship between the PUSCH and the sounding reference signal.

If PUSCH and a sounding reference signal are allocated in the same frequency band in the same sub-frame, the wireless communication terminal device transmits signals in which a sounding reference signal 403 is added after PUSCH 404. In that case, a sub-frame using a slot 0 and a slot 1 includes the PUSCH 404 and the sounding reference signal 403.

Each of the boxes included in the PUSCH 404 and the box that is the sounding reference signal 403 indicates a symbol. The PUSCH 404 stores reference signals for demodulating PUCCH (Demodulation Reference Signals: DEM RS) 401 and 402 at predetermined positions. A baseband receiving unit 103 according to the present embodiment and described below estimates a frequency offset using the reference signal 402 for demodulating PUCCH and the sounding reference signal 403.

The baseband receiving unit 103 obtains, from the scheduling unit 102, the result from the allocation of the radio resource to the signals from each of the wireless communication terminal device. Subsequently, the baseband receiving unit 103 receives the signals from the wireless communication terminal devices according to the allocation of the radio resources. In particular, the baseband receiving unit 103 receives the sounding reference signal and PUSCH according to the result from the allocation of the radio resources to PUSCH and the sounding reference signal.

Subsequently, the baseband receiving unit 103 processes the received signals with a baseband process, and then outputs the signals to the line 2.

Figure 4:
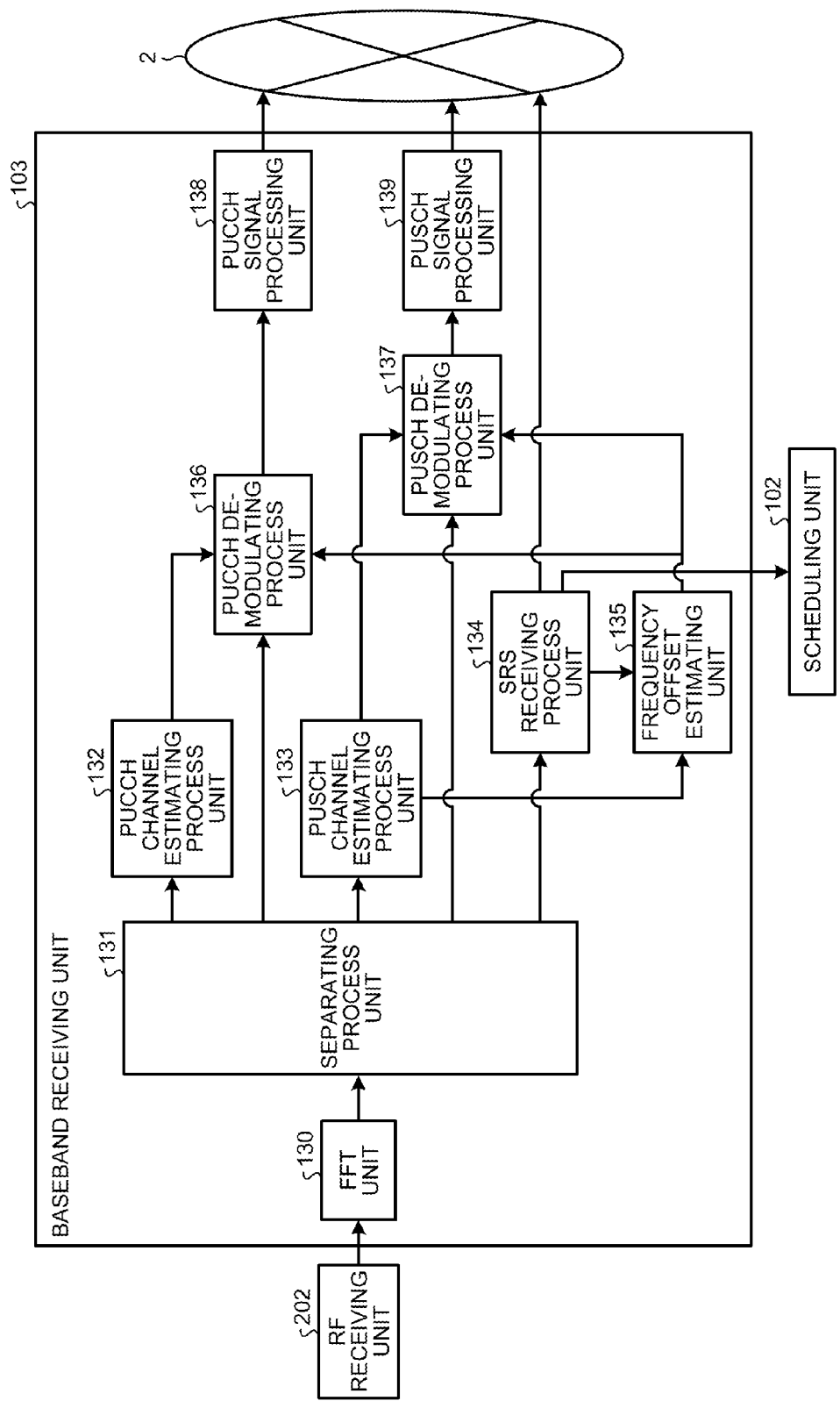
FIG. 4 is a block diagram of the details of a baseband receiving unit according to a first embodiment.

The baseband receiving unit 103 will be described in detail hereinafter with reference to FIG. 4. FIG. 4 is a block diagram of the details of the baseband receiving unit according to the first embodiment.

The baseband receiving unit 103 includes a Fast Fourier Transform (FFT) unit 130, a separating process unit 131, a PUCCH channel estimating process unit 132, a PUSCH channel estimating process unit 133, an SRS receiving process unit 134, and a frequency offset estimating unit 135. The baseband receiving unit 103 further includes a PUCCH demodulating process unit 136, a PUSCH demodulating process unit 137, a PUCCH signal processing unit 138, and a PUSCH signal processing unit 139.

The FFT unit 130 receives, from the RF receiving unit 202, the input of the signals transmitted from the wireless communication terminal device. The FFT unit 130 processes the received signals with a fast Fourier transform process. The FFT unit 130 demodulates the signals received and processed with the fast Fourier transform process. Then, the FFT unit 130 outputs the received and demodulated signals to the separating process unit 131.

The separating process unit 131 receives, from the RF receiving unit 202, the input of the signals transmitted from the wireless communication terminal devices. Subsequently, the separating process unit 131 determines the type of the channel, and then extracts the frequency band of each of the source wireless communication terminal devices from the signals. In other words, the separating process unit 131 divides the received signals into the signals each corresponding to the source wireless communication terminal device.

The separating process unit 131 further divides the signals divided according to the wireless communication terminal devices into those corresponding to respective sub-carriers and symbols. This divides the signals transmitted from the wireless communication terminal device into a reference signal for demodulating PUCCH, PUCCH data, a reference signal for demodulating PUSCH, PUSCH data, and a sounding reference signal.

The separating process unit 131 outputs the reference signal for demodulating PUCCH to the PUCCH channel estimating process unit 132. The separating process unit 131 further outputs the PUCCH data to the PUCCH demodulating process unit 136. The separating process unit 131 further outputs the reference signal for demodulating PUSCH to the PUSCH channel estimating process unit 133. The separating process unit 131 further outputs the PUSCH data to the PUSCH demodulating process unit 137. The separating process unit 131 further outputs the sounding reference signal to the SRS receiving process unit 134.

The PUCCH channel estimating process unit 132 receives the input of the reference signal for demodulating PUCCH from the separating process unit 131. Next, the PUCCH channel estimating process unit 132 finds a PUCCH channel estimation value by estimating a channel for the synchronization of PUCCH. Subsequently, the PUCCH channel estimating process unit 132 outputs the found PUCCH channel estimation value to the PUCCH demodulating process unit 136.

The PUSCH channel estimating process unit 133 receives the input of the reference signal for demodulating PUSCH from the separating process unit 131. Next, the PUSCH channel estimating process unit 133 finds a PUSCH channel estimation value by estimating a channel for the synchronization of PUSCH. The PUSCH channel estimating process unit 133 outputs the found PUSCH channel estimation value to the PUSCH demodulating process unit 137.

The PUSCH channel estimating process unit 133 further outputs the reference signal for demodulating PUSCH to the frequency offset estimating unit 135.

The SRS receiving process unit 134 receives the input of the sounding reference signal from the separating process unit 131. Next, the SRS receiving process unit 134 outputs the sounding reference signal for each of the wireless communication terminal devices to the frequency offset estimating unit 135.

The SRS receiving process unit 134 measures the quality of the signals of each wireless communication terminal device using the sounding reference signal. Subsequently, the SRS receiving process unit 134 outputs the result from the measurement of the quality of the signals, for example, to the scheduling unit 102 and the line 2.

The frequency offset estimating unit 135 receives the input of the reference signal for demodulating PUSCH from the PUSCH channel estimating process unit 133. The frequency offset estimating unit 135 further receives the input of the sounding reference signal from the SRS receiving process unit 134. Subsequently, the frequency offset estimating unit 135 calculates the phase difference between the reference signal for demodulating PUSCH and the sounding reference signal. Next, the frequency offset estimating unit 135 estimates the frequency offset according to the calculated phase difference. Subsequently, the frequency offset estimating unit 135 outputs the estimated frequency offset to the PUCCH demodulating process unit 136 and the PUSCH demodulating process unit 137.

Figure 5:
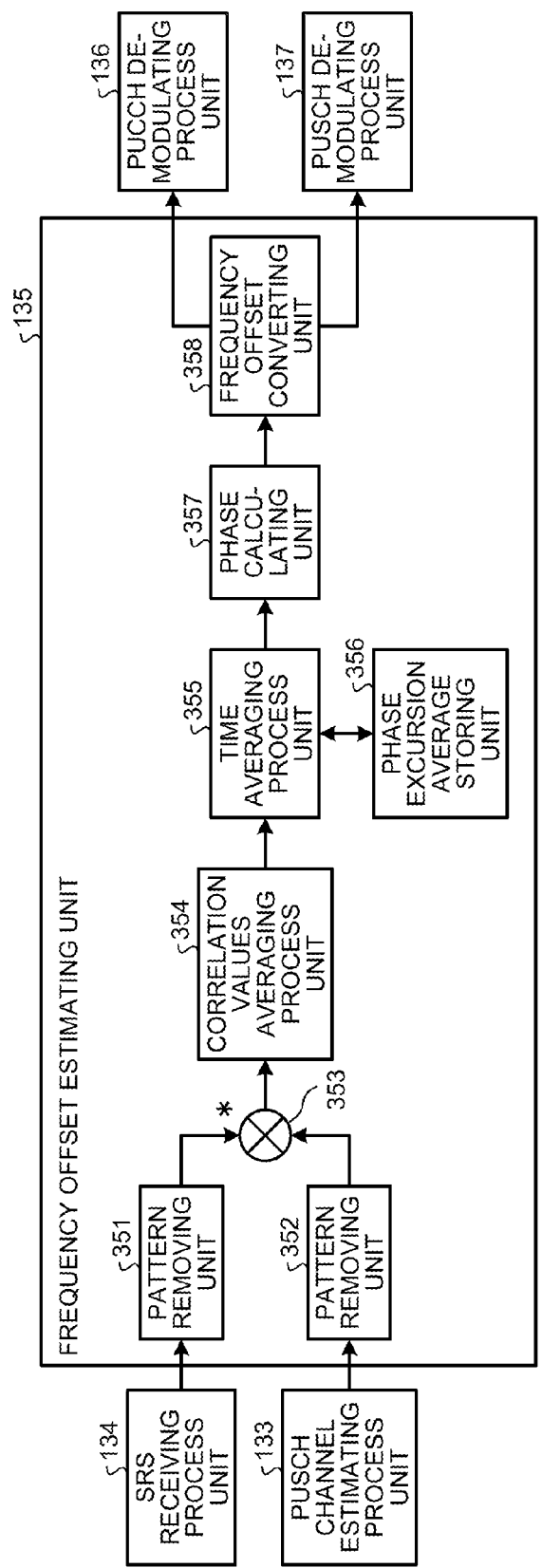
FIG. 5 is a block diagram of the details of a frequency offset estimating unit.

The process for estimating the frequency offset performed with the frequency offset estimating unit 135 will be described in detail hereinafter with reference to FIG. 5. FIG. 5 is a block diagram of the details of the frequency offset estimating unit.

The frequency offset estimating unit 135 includes pattern removing units 351 and 352, a correlation arithmetic unit 353, a correlation values averaging process unit 354, a time averaging process unit 355, a phase excursion average storing unit 356, a phase calculating unit 357, and a frequency offset converting unit 358.

The pattern removing unit 351 receives the input of the sounding reference signal from the SRS receiving process unit 134. The pattern removing unit 351 removes the pattern of the sounding reference signal to extract the channel impulse response obtained from the sounding reference signal. The channel is for the signals including the sounding reference signal and the reference signal for demodulating PUSCH. Subsequently, the pattern removing unit 351 outputs the channel impulse response obtained from the sounding reference signal to the correlation arithmetic unit 353.

The pattern removing unit 352 receives the input of the reference signal for demodulating PUSCH from the PUSCH channel estimating process unit 133. The pattern removing unit 352 removes the pattern of the reference signal for demodulating PUSCH to extract the channel impulse response obtained from the reference signal for demodulating PUSCH. The channel is for the signals including the sounding reference signal and the reference signal for demodulating PUSCH. The pattern removing unit 352 outputs the channel impulse response obtained from the reference signal for demodulating PUSCH to the correlation arithmetic unit 353.

The correlation arithmetic unit 353 obtains, from the pattern removing unit 351, the channel impulse response obtained from the sounding reference signal. The correlation arithmetic unit 353 further obtains, from the pattern removing unit 352, the channel impulse response obtained from the reference signal for demodulating PUSCH.

The correlation arithmetic unit 353 calculates the correlation between the channel impulse response obtained from the sounding reference signal and the channel impulse response obtained from the reference signal for demodulating PUSCH. In that case, when the two channel impulse responses have the same frequency, the impulse responses have almost the same value. In other words, the difference between the two channel impulse responses indicates the difference between the frequencies. Subsequently, the correlation arithmetic unit 353 outputs the information about the correlation between the complex vectors that are the result from the correlation calculation to the correlation values averaging process unit 354.

The correlation values averaging process unit 354 obtains the input of the result from the correlation calculation from the correlation arithmetic unit 353. Next, the correlation values averaging process unit 354 finds a frequency-direction correlation average value that is the average value of the results from the correlation calculations in the frequency direction. Then, the correlation values averaging process unit 354 outputs the found frequency-direction correlation average value to the time averaging process unit 355.

The time averaging process unit 355 receives the input of the frequency-direction correlation average value from the correlation values averaging process unit 354. Subsequently, the time averaging process unit 355 stores the frequency-direction correlation average values in the phase excursion average storing unit 356 until accumulating a predetermined number of frequency-direction correlation average values.

When the predetermined number of frequency-direction correlation average values accumulates in the phase excursion average storing unit 356, the time averaging process unit 355 calculates the time-direction correlation average value that is the average of the frequency-direction correlation average values in the time direction and that is stored in the phase excursion average storing unit 356. Then, the time averaging process unit 355 outputs the calculated time-direction correlation average value to the phase calculating unit 357.

The average of the frequency-direction correlation average value in the time direction is found in the present embodiment in order to improve the accuracy. However, if the reduction in accuracy is allowed, the time averaging process unit 355 can be omitted.

The phase calculating unit 357 receives the input of the time-direction correlation average value from the time averaging process unit 355. Then, the phase calculating unit 357 converts the time-direction correlation average value into an angle and calculates the phase excursion estimation value. In that case, the phase excursion estimation value indicates the angle formed of the vector of the channel impulse response obtained from the sounding reference signal, and the vector of the channel impulse response obtained from the reference signal for demodulating PUSCH. Then, the phase calculating unit 357 outputs the calculated phase excursion estimation value to the frequency offset converting unit 358.

The frequency offset converting unit 358 obtains the phase excursion estimation value from the phase calculating unit 357. Subsequently, the frequency offset converting unit 358 converts the phase excursion estimation value indicated as an angle into a frequency and finds the frequency offset in a symbol. Then, the frequency offset converting unit 358 outputs the found frequency offset to the PUCCH demodulating process unit 136 and the PUSCH demodulating process unit 137.

The description continues with reference to FIG. 4 again. The PUCCH demodulating process unit 136 receives the input of the PUCCH data from the separating process unit 131. The PUCCH demodulating process unit 136 further receives the input of the PUCCH channel estimation value from the PUCCH channel estimating process unit 132. The PUCCH demodulating process unit 136 further receives the input of the frequency offset from the frequency offset estimating unit 135.

The PUCCH demodulating process unit 136 adds the received frequency offset to the PUCCH data. Subsequently, the PUCCH demodulating process unit 136 demodulates the PUCCH data using the PUCCH channel estimation value. Then, the PUCCH demodulating process unit 136 outputs the demodulated PUCCH data to the PUCCH signal processing unit 138.

The PUCCH signal processing unit 138 receives the input of the PUCCH data from the PUCCH demodulating process unit 136. Subsequently, the PUCCH signal processing unit 138 performs various processes such as the reconfiguration, division, and integration of the PUCCH data, the security check, and the header compression. Then, the PUCCH signal processing unit 138 outputs the PUCCH data processed with the various processes to the line 2.

The PUSCH demodulating process unit 137 receives the input of the PUSCH data from the separating process unit 131. The PUSCH demodulating process unit 137 further receives the input of the PUSCH channel estimation value from the PUSCH channel estimating process unit 133. The PUSCH demodulating process unit 137 further receives the input of the frequency offset from the frequency offset estimating unit 135.

The PUSCH demodulating process unit 137 adds the received frequency offset to the PUSCH data. Subsequently, the PUSCH demodulating process unit 137 demodulates the PUSCH data using the PUSCH channel estimation value. Then, the PUSCH demodulating process unit 137 outputs the demodulated PUSCH data to the PUSCH signal processing unit 139.

The PUSCH signal processing unit 139 receives the input of the PUSCH data from the PUSCH demodulating process unit 137. Subsequently, the PUSCH signal processing unit 139 performs various processes such as the reconfiguration, division, and integration of the PUSCH data, the security check, and the header compression. Then, the PUSCH signal processing unit 139 outputs the PUSCH data processed with the various processes to the line 2.

Figure 6:
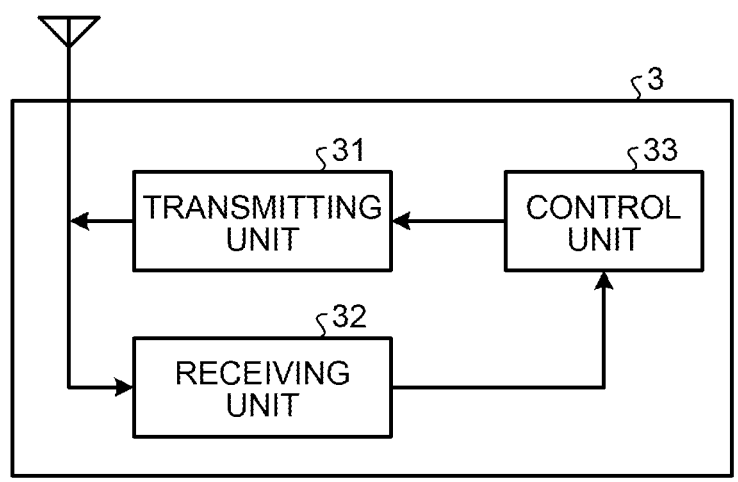
FIG. 6 is a block diagram of a wireless communication terminal device.

Next, the wireless communication terminal device will be described with reference to FIG. 6. FIG. 6 is a block diagram of the wireless communication terminal device. A wireless communication terminal device 3 includes a transmitting unit 31, a receiving unit 32, and a control unit 33. Hereinafter, the case in which the base station apparatus 1 allocates, to PUSCH, the radio resource in the sub-frame at the same time and in the same frequency band as the sounding reference signal for the wireless communication terminal device 3 will be described.

The receiving unit 32 receives the signals transmitted from the base station apparatus 1. The signals transmitted from the base station apparatus 1 include PDCCH including the instruction for the allocation of the radio resources to the sounding reference signal and PUSCH. The receiving unit 32 outputs the received PDCCH to the control unit 33.

The control unit 33 obtains the radio resources allocated to the sounding reference signal and PUSCH from PDCCH. Subsequently, the control unit 33 gives the transmitting unit 31 an instruction to transmit the PUSCH and sounding reference signal using each of the instructed radio resources.

The transmitting unit 31 generates signals including PUSCH and the sounding reference signal, and transmits the generated signals using each of the instructed radio resources to the base station apparatus 1 through the antenna. FIG. 3 illustrates the signals that transmitting unit 31 transmits at that time.

Figure 7:
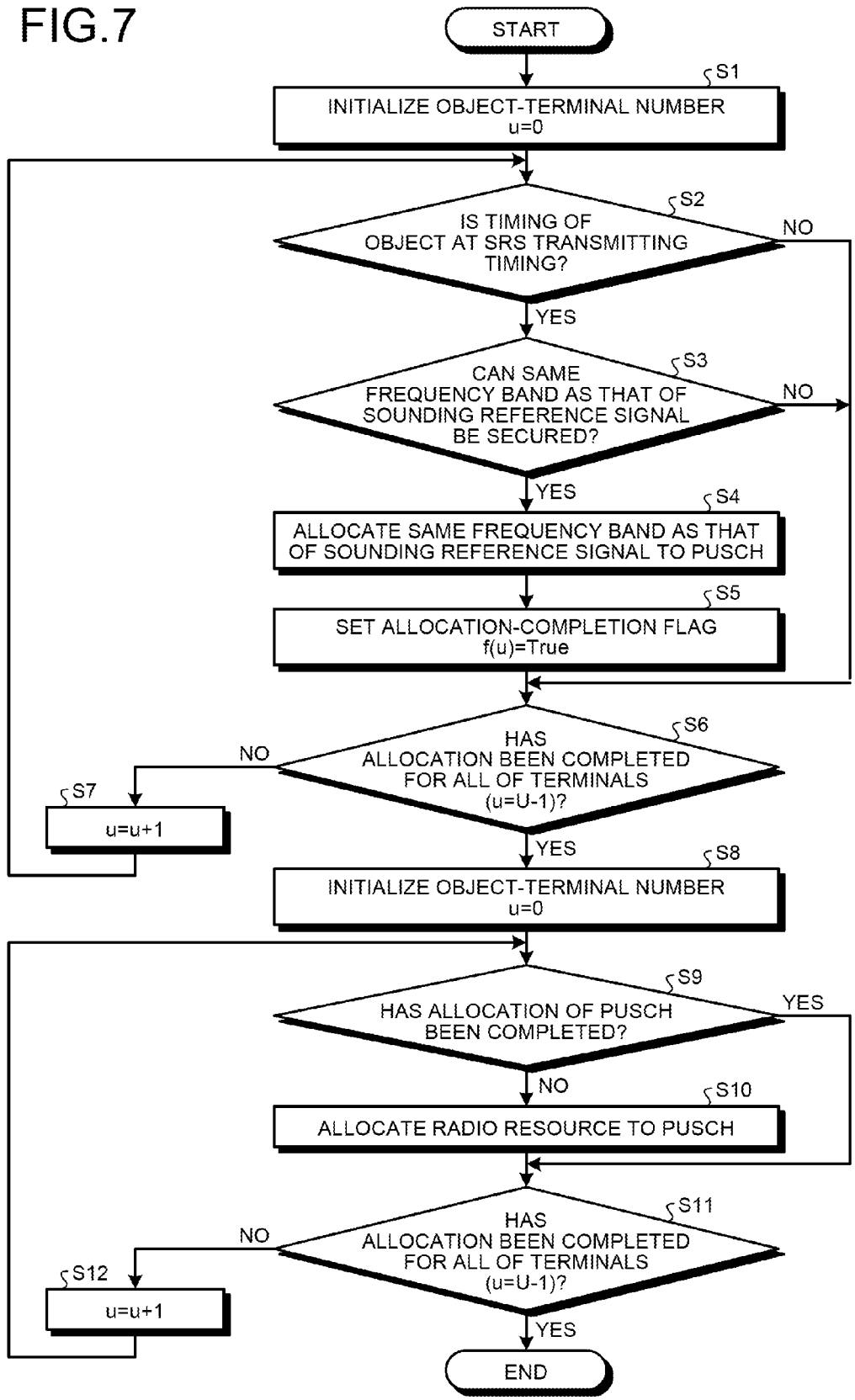
FIG. 7 is a flowchart of a process for allocating the radio resources to the sounding reference signal and PUSCH according to the first embodiment.

Next, a process for allocating the radio resource to PUSCH performed with the scheduling unit will be described with reference to FIG. 7. FIG. 7 is a flowchart of the process according to the first embodiment and for allocating the radio resources to the sounding reference signal and PUSCH.

The SRS allocating unit 121, the PUSCH allocating unit 122, and the schedule notifying unit 123 sequentially put numbers on the wireless communication terminal devices communicating with the base station apparatus 1. The PUSCH allocating unit 122 initializes the object-terminal number (u) that is the number put on the terminal that is an object for which the radio resource is to be allocated to PUSCH. In other words, the PUSCH allocating unit 122 establishes u=0 (step S1).

Next, the PUSCH allocating unit 122 determines whether the sub-frame to be allocated to PUSCH is transmitted at the SRS transmitting timing (step S2). When the sub-frame to be allocated to PUSCH is not transmitted at the SRS transmitting timing (step S2: No), the PUSCH allocating unit 122 goes to step S6.

On the other hand, when the sub-frame to be allocated to PUSCH is transmitted at the SRS transmitting timing (step S2: Yes), the PUSCH allocating unit 122 determines whether the same frequency band as the frequency band of the sounding reference signal can be secured (step S3). When the same frequency band fails to be secured (step S3: No), the PUSCH allocating unit 122 goes to step S6.

On the other hand, when the same frequency band can be secured (step S3: Yes), the PUSCH allocating unit 122 allocates the same frequency band as the frequency band for the sounding reference signal to PUSCH as the allocation of the radio resource for the wireless communication terminal device having the object-terminal number (u) (step S4).

Next, the PUSCH allocating unit 122 flags the wireless communication terminal device of which terminal number is u with an allocation completion flag (step S5). In other words, the PUSCH allocating unit 122 establishes f(u)=True. At that time, f(u) is a flag on the wireless communication terminal device of which terminal number is u. When f(u)=True holds, an allocation completion flag is set. f(u)= indicates that an allocation completion flag is not set.

The PUSCH allocating unit 122 determines whether the allocation of the radio resource to PUSCH at the SRS transmitting timing has been completed for all of the wireless communication terminal devices. In other words, the PUSCH allocating unit 122 determines whether u=U−1 (U is the number of all of the wireless communication terminal devices communicating with the base station apparatus 1) holds (step S6).

When there is a wireless communication terminal device of which determination is not completed (step S6: No), the PUSCH allocating unit 122 increments the object-terminal number (u) by one, in other words, establishes u=u+1 (step S7). The process goes back to step S2.

On the other hand, when the determination for all of the wireless communication terminal devices has been completed (step S6: Yes), the PUSCH allocating unit 122 initializes the object-terminal number (u) again. In other words, the PUSCH allocating unit 122 establishes u=0 (step S8).

Next, the PUSCH allocating unit 122 determines whether the radio resource has been allocated to PUSCH for the wireless communication terminal device of which terminal number is u by confirming the allocation completion flag (f(u)) (step S9). When the allocation has been completed (step S9: Yes), the PUSCH allocating unit 122 goes to step S11.

On the other hand, when the allocation has not been completed (step S9: No), the PUSCH allocating unit 122 allocates the radio resource to PUSCH for the wireless communication terminal device of which terminal number is u (step S10).

Next, the PUSCH allocating unit 122 determines whether the allocation of the radio resource to PUSCH has been completed for all of the wireless communication terminal devices. In other words, the PUSCH allocating unit 122 determines whether u=U−1 holds (step S11).

When there is a wireless communication terminal device for which the allocation of the radio resource to PUSCH has not completed (step S11: No), the PUSCH allocating unit 122 increments the object-terminal number (u) by one, in other words, establishes u=u+1 (step S12). Then, the process goes back to step S9.

On the other hand, when the allocation of the radio resource to PUSCH has been completed for all of the wireless communication terminal devices (step S11: Yes), the PUSCH allocating unit 122 terminates the allocation of the radio resource to PUSCH.

As described above, the base station apparatus according to the present embodiment estimates a frequency offset using the sounding signal and signal for demodulating PUSCH that are next to each other by receiving the sounding signal and PUSCH in the same sub-frame and the same frequency from the wireless communication terminal device.

The interval between the sounding signal and the reference signal for demodulating PUSCH is narrower than the interval between the reference signals for demodulating PUSCH. For example, the interval between the demodulating reference signals is 500 µs in PUSCH in the LTE. On the other hand, the interval between the sounding signal and the reference signal for demodulating PUSCH is three orthogonal Frequency Division Multiplexing (OFDM) symbols, namely, 214.0625 µs.

According to the expression (4) described above, a narrower interval between the two signals used for estimation expands the range in which the frequency offset can be estimated in that case. In other words, the base station apparatus according to the present embodiment can estimate the frequency offset in a wider range than when only the reference signals for demodulating PUSCH are used.

Specifically, the base station apparatus according to the present embodiment can estimate the frequency offset in the range of about ±2333 Hz.

For example, FIG. 8 is a diagram of the Doppler frequencies in the signals received the base station apparatus, determined depending on the wireless communication terminal device and the signals. For example, when the carrier frequency is 2.5 GHz and the wireless communication terminal device moves at a speed of 400 km/h, the Doppler frequency is 1852 Hz. The Doppler frequency in that case is also included in the range of about ±2333 Hz in which the base station apparatus according to the present embodiment estimates the frequency offset. In other words, the base station apparatus according to the present embodiment can appropriately estimate the frequency offset if the moving body that moves at a speed of about 400 km/h or lower (for example, on the Shinkansen bullet train) communicates with the base station apparatus using a carrier frequency of 2.5 Ghz or lower.

The base station apparatus according to the present embodiment further can estimate the frequency offset in a wide range even in a cell in which PUCCH does not exist, for example, in SCell during Carrier Aggregation (CA) because the base station apparatus estimates the frequency offset using PUSCH and the sounding reference signal.

[b] Second Embodiment

Next, a second embodiment will be described. In the first embodiment, the scheduling is performed so as to cause all of the wireless communication terminal devices at the SRS transmitting timing to transmit PUSCH at the same time as the SRS transmitting timing. However, estimating the frequency offset again for the wireless communication terminal device that transmits signals with an appropriate frequency offset is an unnecessary process. In light of the foregoing, the scheduling is performed in the present embodiment after narrowing the number of the wireless communication terminals for which the frequency offset is to be estimated. The base station apparatus and wireless communication terminal devices according to the present embodiment also include the function units illustrated in FIGS. 1, 2, 4, 5, and 6, respectively. The descriptions about the units having the same functions as in the first embodiment will be omitted below.

A PUSCH allocating unit 122 in a scheduling unit 102 includes a timer. Additionally, the scheduling unit 102 stores a reference period used to determine whether to include the wireless communication terminal device as a wireless communication terminal device for which the frequency offset is to be estimated. The PUSCH allocating unit 122 stores the last time when the frequency offset has been estimated for each wireless communication terminal device.

The PUSCH allocating unit 122 calculates the scheduling metric (M) expressed by the expression (5) for each of the wireless communication terminal devices before allocating a radio resource in a sub-frame. Subsequently, the PUSCH allocating unit 122 determines using the timer whether the reference period has elapsed since the last estimation of the frequency offset in descending order of the value of the calculated scheduling metric (M) of the wireless communication terminal device. When the reference period has elapsed, the PUSCH allocating unit 122 determines the currently-selected wireless communication terminal device as a wireless communication terminal device for which the frequency offset is to be estimated.

The PUSCH allocating unit 122 repeats the determination of the wireless communication terminal device for which the frequency offset is to be estimated in order to select the wireless communication terminal devices as many as PUSCH can be transmitted as the wireless communication terminal devices that transmit PUSCH in a sub-frame that is to be allocated to PUSCH.

As described above, the base station apparatus according to the present embodiment selects the wireless communication terminal devices for which a predetermined period has elapsed since the last estimation of the frequency offset as a wireless communication terminal device for which the frequency offset is to be estimated among the wireless communication terminal devices at the SRS transmitting timing. This appropriately can narrow the number of the wireless communication terminal devices for which the frequency offset is to be estimated and thus can reduce the load in the process for estimating the frequency offset.

[c] Third Embodiment

Figure 9:
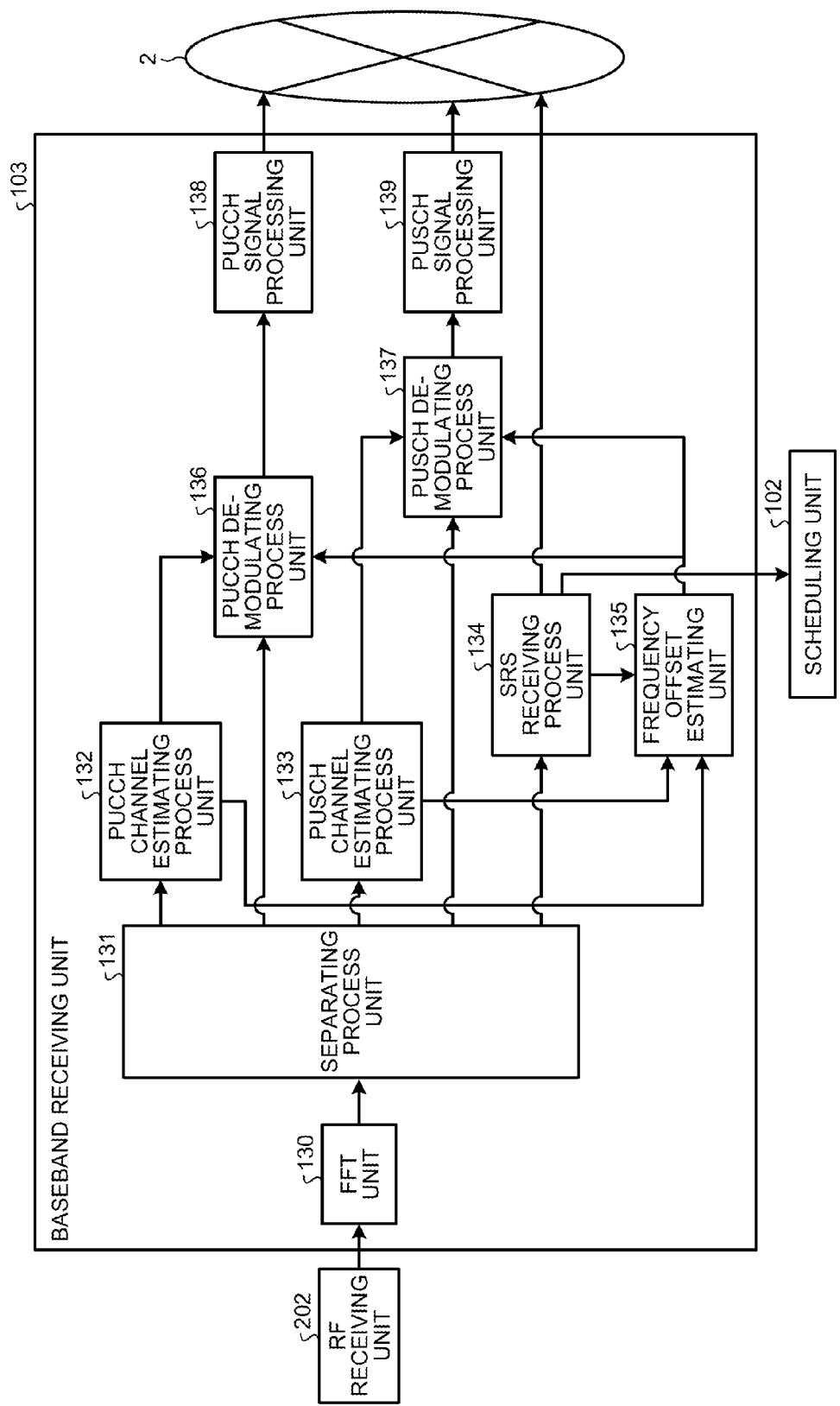
FIG. 9 is a block diagram of the details of a baseband receiving unit according to a third embodiment.

Next, a third embodiment will be described. Differently from the first embodiment, the base station apparatus according to the present embodiment identifies a wireless communication terminal device that moves at a high speed according to the information in Primary Cell (PCell), and then estimates the frequency offset in Secondary Cell (SCell) for the identified wireless communication terminal device. The base station apparatus and wireless communication terminal devices according to the present embodiment also include the function units illustrated in FIGS. 1, 2, and 6, respectively. However, the base station apparatus according to the present embodiment includes two antennas, namely, an antenna for the communication in PCell and an antenna for the communication in SCell. The descriptions about the units having the same functions as in the first embodiment will be omitted below. FIG. 9 is a block diagram of the details of a baseband receiving unit according to the third embodiment.

The base station apparatus 1 communicates with the wireless communication terminal device 3 using the Carrier Aggregation (CA) in the present embodiment.

The communication using CA is performed using PUCCH in PCell whereas being performed without PUCCH in SCell. Thus, the frequency offset can be estimated in a wide range using PUCCH and PUSCH in PCell. On the other hand, it is difficult to estimate the frequency offset using PUCCH in SCell. Furthermore, it is difficult to use the frequency offset estimated using PCell as the frequency offset in SCell without any change because the antennas for PCell and SCell are different and, for example, the antennas have the different polar characters. In light of the foregoing, the base station apparatus according to the present embodiment estimates the frequency offset in SCell after narrowing the number of the wireless communication terminal devices for which the frequency offset is to be estimated in SCell according to the information in PCell.

A scheduling unit 102 allocates the radio resource to PUCCH and PUSCH in PCell for each wireless communication terminal device. Subsequently, the scheduling unit 102 outputs the result from the allocation to the baseband transmitting unit 101.

Subsequently, the scheduling unit 102 receives the input of the frequency offset in PCell for each wireless communication terminal device from the frequency offset estimating unit 135.

The scheduling unit 102 stores the threshold of the frequency offset used to select a wireless communication terminal device. The scheduling unit 102 selects the wireless communication terminal devices that transmit signals of which frequency offset in PCell has a value equal to or higher than the threshold. Then, the scheduling unit 102 preferentially allocates the same frequency band in the same sub-frame at the SRS transmitting timing to PUSCH in SCell for the selected wireless communication terminal device.

The scheduling unit 102 further allocates the radio resource to PUSCH normally in SCell for the wireless communication terminal devices that transmit signals of which frequency offset in PCell has a value lower than the threshold. However, when the radio resource is allocated to PUSCH for the wireless communication terminal device that transmits signals of which frequency offset in PCell has a value equal to or higher than the threshold, the scheduling unit 102 allocates the radio resource other than the already-allocated radio resource to PUSCH.

Then, the scheduling unit 102 outputs the result from the allocation of the radio resource in SCell for each of the wireless communication terminal devices to the baseband transmitting unit 101.

The baseband transmitting unit 101 obtains, from the scheduling unit 102, the result from the allocation of the radio resource to PUCCH and PUSCH in PCell for each of the wireless communication terminal devices. Then, the baseband transmitting unit 101 creates PDCCH notifying the allocation of the radio resource to the assigned PUCCH and PUSCH, and outputs the PDCCH to the RF transmitting unit 201.

The frequency offset estimating unit 135 receives the input of the reference signal for demodulating PUCCH in PCell from the PUCCH channel estimating process unit 132. The frequency offset estimating unit 135 also receives the input of the reference signal for demodulating PUSCH in PCell from the PUSCH channel estimating process unit 133.

Subsequently, the frequency offset estimating unit 135 estimates the frequency offset in PCell according to the reference signal for demodulating PUCCH and reference signal for demodulating PUSCH. Specifically, the frequency offset estimating unit 135 performs the process described with reference to FIG. 5 in the first embodiment using the signal for demodulating PUCCH instead of the sounding signal.

Then, the frequency offset estimating unit 135 outputs the value of the frequency offset in PCell for each of the wireless communication terminal devices to the scheduling unit 102 and the line 2.

Subsequently, the baseband receiving unit 103 receives the signals in SCell including the sounding reference signal and PUSCH from the wireless communication terminal device for which the radio resource in the same sub-frame and in the same frequency band as the sounding reference signal is allocated to PUSCH. Subsequently, the baseband receiving unit 103 estimates the frequency offset in SCell according to the sounding reference signal and PUSCH. Then, the baseband receiving unit 103 modulates the PUSCH using the estimated frequency offset.

Figure 10:
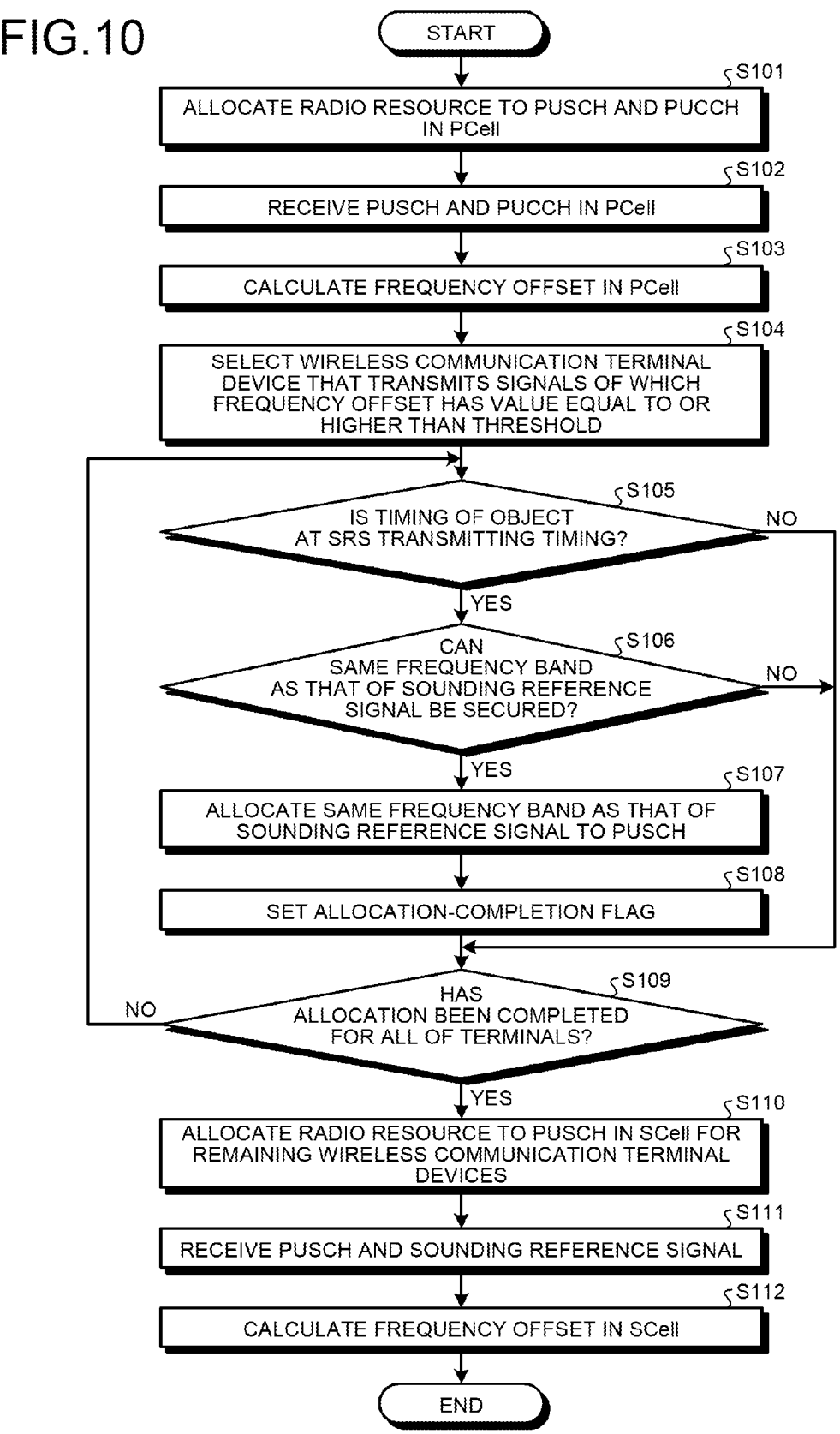
FIG. 10 is a flowchart of a process for estimating a frequency offset performed in a base station apparatus according to the third embodiment.

Next, the process for estimating the frequency offset in the base station apparatus according to the present embodiment will be described with reference to FIG. 10. FIG. 10 is a flowchart of the process for estimating the frequency offset in the base station apparatus according to the third embodiment.

A scheduling unit 102 allocates the radio resources to PUSCH and PUCCH in PCell for each of the wireless communication terminal devices (step S101). A baseband transmitting unit 101 and the RF transmitting unit 201 transmit, to each of the wireless communication terminal devices, the allocation of the radio resources to PUSCH and PUCCH in PCell.

Next, the baseband receiving unit 103 receives the PUSCH and PUCCH in PCell from each of the wireless communication terminal devices (step S102).

Subsequently, the baseband receiving unit 103 calculates the frequency offset in PCell for each of the wireless communication terminal devices according to the received PUSCH and PUCCH (step S103). The baseband receiving unit 103 outputs the calculated frequency offset in PCell for each of the wireless communication terminal devices to the scheduling unit 102.

The scheduling unit 102 selects a wireless communication terminal that transmits signals of which frequency offset in PCell has a value equal to or higher than the threshold (step S104).

Then, the scheduling unit 102 selects, among the selected wireless communication terminals, a wireless communication terminal for which it is not determined whether to allocate PUSCH in order to determine whether the sub-frame to which PUSCH is to be allocated is at the SRS transmitting timing (step S105). When the sub-frame to which PUSCH is to be allocated is not at the SRS transmitting timing (step S105: No), a PUSCH allocating unit 122 goes to step S109.

On the other hand, when the sub-frame to which PUSCH is to be allocated is at the SRS transmitting timing (step S105: Yes), the PUSCH allocating unit 122 determines whether the same frequency band as the frequency band of the sounding reference signal can be secured (step S106). When the same frequency band fails to be secured (step S106: No), the PUSCH allocating unit 122 goes to step S109.

On the other hand, when the same frequency band can be secured (step S106: Yes), the PUSCH allocating unit 122 allocates the same frequency band as the sounding reference signal to PUSCH as the allocation of the radio resources for the wireless communication terminal device currently selected as the object to be determined (step S107).

Next, the PUSCH allocating unit 122 flags the wireless communication terminal device currently selected as the object to be determined with an allocation completion flag (step S108).

The PUSCH allocating unit 122 determines whether the determination of the allocation of the radio resource to PUSCH has been completed for all of the selected wireless communication terminal devices (step S109).

When there is a wireless communication terminal device that has not been determined (step S109: No), the PUSCH allocating unit 122 goes back to step S105.

On the other hand, when the determination for all of the selected wireless communication terminal devices has been completed (step S109: Yes), the PUSCH allocating unit 122 performs the next process. The PUSCH allocating unit 122 allocates the radio resource to PUSCH for the remaining wireless communication terminal device for which the radio resource has not been allocated to PUSCH while confirming the allocation completion flag (step S110). The baseband transmitting unit 101 and the RF transmitting unit 201 transmit, to each of the wireless communication terminal device, the allocation of the radio resources to PUSCH and PUCCH in PCell.

Next, the baseband receiving unit 103 receives the PUSCH and sounding reference signal in SCell from each of the wireless communication terminal devices (step S111).

Subsequently, the baseband receiving unit 103 calculates the frequency offset in SCell for each of the wireless communication terminal devices according to the received PUSCH and sounding reference signal (step S112).

In that case in the present embodiment, the frequency offset in SCell is estimated for a wireless communication terminal device that merely transmits signals having a large frequency offset, in other words, that moves at a high speed. However, the number of the wireless communication terminals to be estimated can further be narrowed.

For example, as described in the second embodiment, the scheduling unit 102 stores the last time when the frequency offset has been estimated for each of the wireless communication terminal devices. Subsequently, the scheduling unit 102 can select, among the wireless communication terminal devices each transmitting signals having the frequency offset equal to or higher than the threshold, a wireless communication terminal device for which a predetermined period has elapsed since the last estimation of the frequency offset as a wireless communication terminal device to be estimated. This can appropriately narrow the number of the wireless communication terminal devices to communicate with, and thus can reduce the load in the process for estimating the frequency offset.

Hardware Configuration

Figure 11:
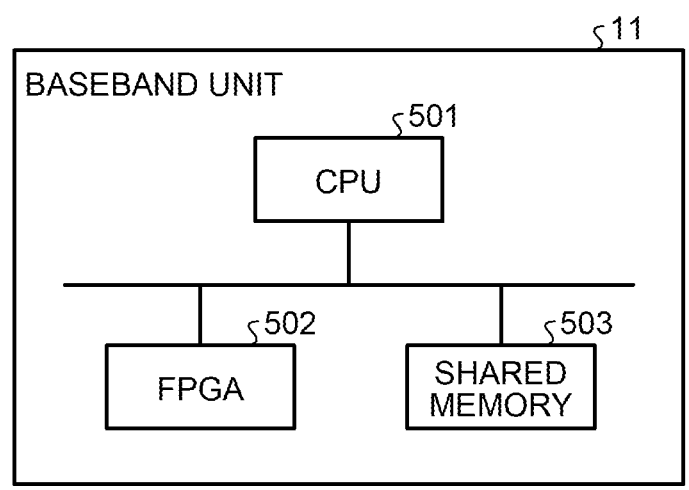
FIG. 11 is a diagram of an exemplary hardware configuration in a baseband unit.

Next, the hardware configuration of the baseband unit 11 according to each of the embodiments described above will be described with reference to FIG. 11. FIG. 11 is a diagram of an exemplary hardware configuration in the baseband unit.

The baseband unit 11 includes a Central Processing Unit (CPU) 501, a Field Programmable Gate Array (FPGA) 502, and a shared memory 503. The CPU 501, the FPGA 502, and the shared memory 503 are connected to each other via a bus.

The shared memory 503 is a storage device. The shared memory 503 stores various programs including a program that implements the function of each unit described in the first embodiment and illustrated in FIGS. 2 and 4.

The CPU 501 implements each function of the scheduling unit 102 by reading each program from the shared memory 503 and executing the program. For example, the CPU 501 implements the functions of the SRS allocating unit 121, PUSCH allocating unit 122, and the schedule notifying unit 123.

The FPGA 502 implements the functions, for example, of the baseband transmitting unit 101 and the baseband receiving unit 103 while cooperating with the shared memory 503. For example, the FPGA 502 implements the function of the frequency offset estimating unit 135.

Furthermore, the FPGA, CPU, and memory also implement the functions of the transmitting unit 31, the receiving unit 32, and the control unit 33 illustrated in FIG. 6 as an example. Alternatively, some of the functions of the transmitting unit 31, the receiving unit 32, and the control unit 33 are implemented, for example, with a combinational circuit.

An aspect of the base station apparatus, wireless communication system, wireless communication terminal device, and method for controlling a wireless communication system disclosed in the present invention has the effect of expanding the range in which the frequency offset can be estimated.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station apparatus comprising:
    a receiving unit that receives a transmitted signal which has been transmitted from a wireless communication terminal device and which includes a plurality of symbols arranged in a time direction;
    a frequency offset estimating unit that estimates a frequency offset based on a first signal which is mapped to a first symbol placed at a predetermined position in the transmitted signal received with the receiving unit and which is for measuring quality, and a second signal which is mapped to a second symbol placed at a position different from the first symbol in the transmitted signal and which is for demodulation, the second signal being transmitted in a sub-frame and frequency band that are identical to a sub-frame and frequency band of the first signal; and
    a transmission instructing unit that gives the wireless communication terminal device an instruction to transmit the second signal in the sub-frame and frequency band that are identical to the sub-frame and frequency band of the first signal.

2. The base station apparatus according to claim 1, wherein the transmitted signal periodically include the first signal, and
    the transmission instructing unit gives, to the wireless communication terminal device that transmits the transmitted signal including the first signal, an instruction to transmit the second signal in the sub-frame and frequency band that are identical to the sub-frame and frequency band of the first signal.

3. The base station apparatus according to claim 1, wherein the transmission instructing unit gives the wireless communication terminal device an instruction to transmit a reference signal for demodulating PUCCH in a sub-frame at a transmitting timing of a sounding reference signal and in a frequency band identical to a frequency band of the sounding reference signal by allocating an uplink physical channel including a reference signal for demodulating PUCCH that is the second signal to a transmission-unit signal at the transmitting timing of the sounding reference signal that is the first signal and in a frequency band identical to the frequency band of the sounding reference signal, and
    the frequency offset estimating unit obtains the sounding reference signal and the demodulating reference signal from the transmitted signal transmitted from the wireless communication terminal device to which the transmission instructing unit has given the instruction, and estimates a frequency offset using the obtained sounding reference signal and reference signal for demodulating PUCCH.

4. The base station apparatus according to claim 3, wherein a plurality of wireless communication terminal devices exist, and
    the transmission instructing unit allocates a physical channel to each of the wireless communication terminal devices at different times, and allocates the physical channel preferentially to a specific wireless communication terminal device at a timing at which the specific wireless communication terminal device transmits the first signal.

5. The base station apparatus according to claim 3, wherein the transmission instructing unit extracts the wireless communication terminal device for which the frequency offset has not been estimated for a predetermined period of time and determines the extracted wireless communication terminal device as the specific wireless communication terminal device.

6. The base station apparatus according to claim 1, wherein the receiving unit receives a main transmitted signal including the first signal and a third signal for demodulating a control signal placed at a third symbol placed at a position different from the first signal, and a sub transmitted signal including the first signal and the second signal, and
    the frequency offset estimating unit estimates a frequency offset of the main transmitted signal based on the first signal and third signal in the main transmitted signal received with the receiving unit, and further estimates a frequency offset of the sub transmitted signal based on the first signal and second signal in the sub transmitted signal received from a wireless communication device that transmits the main transmitted signal of which frequency offset has a value equal to or higher than a threshold.

7. A wireless communication system comprising:
    a base station apparatus, and
    a wireless communication terminal device;
    wherein the base station apparatus includes:
    a transmission instructing unit that gives the wireless communication terminal device an instruction to transmit a signal which includes a plurality of symbols arranged in a time direction and in which a first signal for measuring quality is mapped to a first symbol at a predetermined position in the signal and a second signal for demodulation is mapped to a second symbol placed at a different position from the first symbol and to transmit the second signal in a sub-frame and frequency band that are identical to a sub-frame and frequency band of the first signal,
    a receiving unit that receives the transmitted signal transmitted from the wireless communication terminal device, and
    a frequency offset estimating unit that estimates a frequency offset based on the first signal and second signal in the transmitted signal received with the receiving unit, the second signal is transmitted in the sub-frame and frequency band that are identical to the sub-frame and frequency band of the first signal; and
    wherein the wireless communication terminal device includes:
    a control unit that receives the instruction from the transmission instructing unit, and give an instruction to generate the signal to be transmitted in which the first signal is mapped to the first symbol and the second signal is mapped to the second symbol, and
    a transmitting unit configured to generate the signal to be transmitted in compliance with the instruction from the control unit and then transmit the signals.

8. A wireless communication terminal device comprising:
    a control unit that receives a transmission instruction from a base station apparatus which includes: a transmission instructing unit that gives the wireless communication terminal device an instruction to transmit a signal which includes a plurality of symbols arranged in a time direction and in which a first signal for measuring quality is mapped to a first symbol at a predetermined position in the signal and a second signal for demodulation is mapped to a second symbol placed at a different position from the first symbol, a receiving unit that receives a transmitted signal transmitted from the wireless communication terminal device, a frequency offset estimating unit that estimates a frequency offset based on the first signal and second signal in the transmitted signal received with the receiving unit, the second signal being transmitted in a sub-frame and frequency band that are identical to a sub-frame and frequency band of the first signal, and that gives an instruction to generate the signal to be transmitted in which the first signal is mapped to the first symbol and the second signal is mapped to the second symbol and to transmit the second signal in the sub-frame and frequency band that are identical to the sub-frame and frequency band of the first signal; and a transmitting unit that generates the signal to be transmitted in compliance with the instruction from the control unit and then transmit the signal.

9. A method for controlling a wireless communication system including a base station apparatus and a wireless communication terminal device, the method comprising:

giving, by the base station apparatus, the wireless communication terminal device an instruction to transmit a signal which includes a plurality of symbols arranged in a time direction and in which a first signal for measuring quality is mapped to a first symbol at a predetermined position in the signal and a second signal for demodulation is mapped to a second symbol placed at a different position from the first symbol and to transmit the second signal in a sub-frame and frequency band that are identical to a sub-frame and frequency band of the first signal;

receiving, by the wireless communication terminal device, the instruction from the base station apparatus, to generate the signal to be transmitted in which the first signal is mapped to the first symbol and the second signal is mapped to the second symbol, and to transmit the generated signals in the identical sub-frame and frequency band; and receiving, by the base station apparatus, the transmitted signal transmitted from the wireless communication terminal device, and to estimate a frequency offset based on the first signal and second signal in the transmitted signal.

* * * * *